United States Patent
Fitzgerald et al.

(10) Patent No.: US 7,669,044 B2
(45) Date of Patent: Feb. 23, 2010

(54) ACCELERATED SYSTEM BOOT

(75) Inventors: Robert P. Fitzgerald, Fall City, WA (US); Alexander Kirshenbaum, Redmond, WA (US); Michael R. Fortin, Redmond, WA (US); Aaron Dietrich, Bothell, WA (US); Cenk Ergan, Bellevue, WA (US); Charles T. Lenzmeier, Silverthorne, CO (US); Matthew Ayers, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 550 days.

(21) Appl. No.: 11/536,849

(22) Filed: Sep. 29, 2006

(65) Prior Publication Data

US 2008/0082812 A1 Apr. 3, 2008

(51) Int. Cl.
*G06F 9/00* (2006.01)
(52) U.S. Cl. .......................... 713/1; 711/100; 711/112; 711/158
(58) Field of Classification Search .................... 713/1; 711/100, 112, 158
See application file for complete search history.

(56) References Cited

U.S. PATENT DOCUMENTS

| | | | | |
|---|---|---|---|---|
| 5,455,924 A * | 10/1995 | Shenoy et al. | .............. | 711/118 |
| 5,822,773 A * | 10/1998 | Pritchard et al. | ............ | 711/162 |
| 5,933,630 A * | 8/1999 | Ballard et al. | .................. | 713/1 |
| 6,073,232 A * | 6/2000 | Kroeker et al. | ................. | 713/1 |
| 6,202,121 B1 * | 3/2001 | Walsh et al. | ................ | 711/100 |
| 6,339,811 B1 * | 1/2002 | Gaertner et al. | ............ | 711/112 |
| 6,347,370 B1 * | 2/2002 | Grimsrud | ....................... | 713/1 |
| 6,968,450 B1 * | 11/2005 | Rothberg et al. | ............... | 713/1 |
| 2005/0055517 A1 * | 3/2005 | Olds et al. | .................. | 711/158 |
| 2005/0102467 A1 * | 5/2005 | Lam et al. | .................... | 711/112 |
| 2005/0246487 A1 * | 11/2005 | Ergan et al. | ................. | 711/113 |
| 2007/0005905 A1 * | 1/2007 | Yasue et al. | ................. | 711/137 |
| 2008/0256295 A1 * | 10/2008 | Lambert et al. | ............ | 711/118 |

FOREIGN PATENT DOCUMENTS

WO   WO2005071538   *   8/2005

* cited by examiner

*Primary Examiner*—Thomas Lee
*Assistant Examiner*—Vincent T Tran
(74) *Attorney, Agent, or Firm*—Marshall, Gerstein & Borun LLP (57) ABSTRACT

Increased efficiency in booting a computer uses a process of logging physical-level disk access during a boot cycle for use in creating a boot plan for a subsequent boot. Processing the log from one or more previous boots removes unnecessary reads such as those associated with temporary files and then orders the remaining read accesses based on times of prior read accesses and and by physical location on the disk. Upon boot, data likely to be requested first orders the remaining read accesses based on times of prior read accesses and By taking advantage of disk head and platter characteristics, data is read in sweeps through the disk, reducing overall latency. Requests that are not in cache may be held if the data is already scheduled for retrieval.

18 Claims, 6 Drawing Sheets

402 — Format trace file(s)

404 — Remove read after write and write-only entries

406 — Remove entries appearing in less than critical number of runs (e.g. <0.5)

ACCELERATED SYSTEM BOOT

BACKGROUND

The process of booting a computer often involves starting dozens if not hundreds of individual services and applications. Virtually all of the services and applications access data stored in nonvolatile memory, such as a disk drive. As each of the services and applications being started requests its associated data, the nonvolatile memory, particularly a disk drive, becomes input-output bound and cannot service the requests at the rate the requests arrive. Those familiar with computers, especially personal computers, may have noted the indicator light associated with disk activity remains on almost continuously during a boot cycle. This is evidence of the boot process being disk I/O bound. The result is lengthy boot times that only increase as more services are added, causing increasing frustration on the part of a user waiting to use the computer.

One attempt at improving boot time monitored disk access at a high level to create a log of logical file accesses, that is, files by name that were used in the boot process. These files were loaded at boot time and cached for retrieval by a foreground process that may subsequently request information contained in the file. However, this technique provided only limited improvement because entire files were retrieved, potentially from different areas of the disk, when only a portion of the file might be required. Further, no consideration was given to the physical location of the file on the desk. Retrieving more data than was required, particularly in light of the potential increase in disk access time, placed a limit on an overall reduction in boot time.

SUMMARY

A combination of techniques may be used to improve boot time for a computer, including monitoring disk access at a low level to create a log of physical addresses accessed during a boot process. Using the log of physical addresses accessed during a boot, a boot plan may be generated by organizing retrieval of boot data considering both the time when the data was accessed and the physical organization of the data on the disk, thus optimizing read head movement and delivering to a cache memory required information before it is requested by an associated foreground process. Further analysis of the log may be used to reveal temporary data, that is, data written and then read back, or data that is written only. Removing this one-time data helps refine the boot plan to include only data that may be required for a subsequent boot, with a corresponding improvement in boot time.

When the pre-fetching of data is based on a sufficiently accurate boot plan, most, if not all, of the disk access latency can be eliminated as a cause of boot delay when starting a computer.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
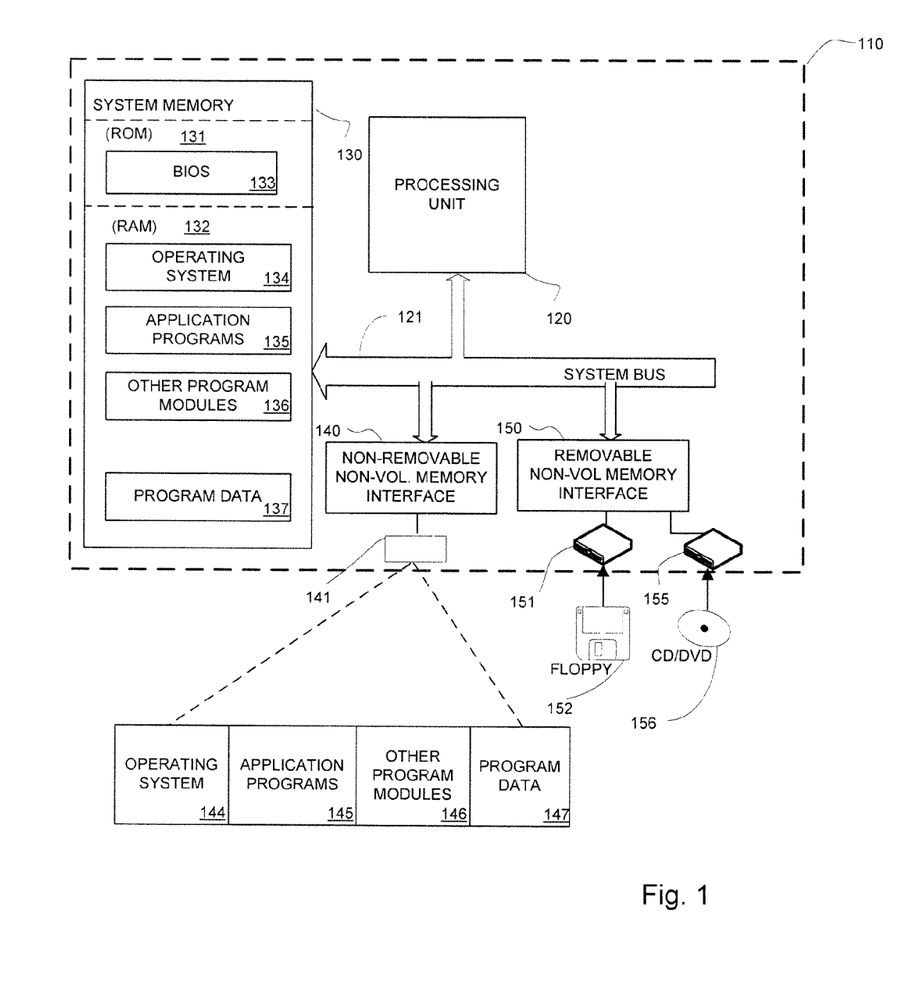
FIG. 1 is a simplified and representative block diagram of a computer suitable for implementing the current invention.

FIG. 1 illustrates a computing device in the form of a computer 110 that may host one or more of the embodiments of the current disclosure and is discussed in detail to provide a context for subsequent discussions.

Components of the computer 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures.

The computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. During the boot process, that is, when starting up the computer 110 during power up or after a system reset, a significant amount of data may be read from non-volatile memory, for example, from hard disk 141, into system memory 130. Because the hard disk 141 is typically the slowest link in the boot path, steps such as those described below may be used to increase the efficiency with which data is read from the hard disk 141 and transferred to system memory 130, thereby reducing the overall time required to boot the computer. Computer-executable instructions for implementing the described boot process may also be stored on the hard disk 141 or other non-volatile memory.

Figure 2:
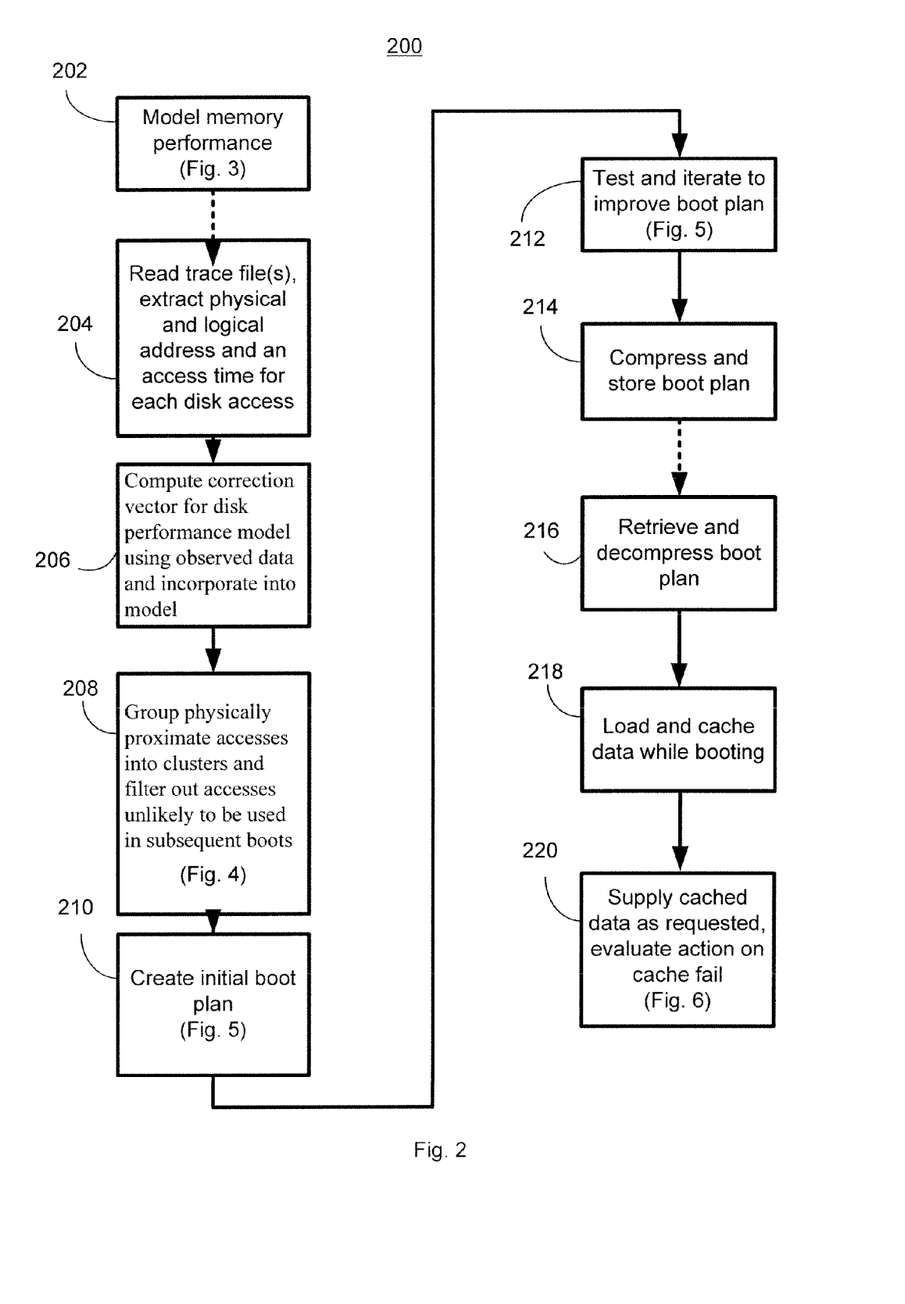
FIG. 2 is a method of improving boot time performance.

Referring to FIG. 2, a method 200 of improving boot time performance is discussed and described. The method 200, and its equivalents, in general take advantage of the notion that during the boot process many of the files, applications, utilities, and the like will be loaded in a given boot cycle much in the same manner that they were loaded in previous boot cycles. A large portion of the data required the during startup process remains the same even after adding a new driver or utility. As discussed above, previous attempts to take advantage of this characteristic logged the files that were accessed during boot and attempted to place them in a cache for quicker access when requested by a foreground process. Because both the logging and retrieval took place at the logical level, that is, the file name level, the effectiveness was at least in part limited because a disk drive does not necessarily store the segments of a file in any particular order. Optimization of disk head performance is not possible in this logical or virtual pre-fetching scheme. Thus, when the prior art process retrieved files during a boot process, the disk head may move almost randomly to different portions of the disk, increasing the latency of the data access. One optimization for disk head performance is to schedule hundreds of fetches to the disk and order them by increasing address. However, because hundreds of disk accesses were queued, cache misses had to be queued after completion of the entire batch, causing a different delay. Further, not all the boot data is in files, such as a volume bitmap file. File-level pre-fetching was not able to account for non-file data requirements. Non-file fetches waiting behind a batch of fetches can also cause long delays.

The method 200 described below uses a combination of refinements that each contribute to the overall effectiveness of booting a computer and, when applied properly, may result in noticeably faster boot times over prior art practices. In general, the refinements include, but are not limited to, logging the physical location of disk accesses; modeling performance of the main storage, such as disk drive 141, to predict actual latency in data retrieval; filtering out address locations not likely to be used in the next boot; and reducing latency associated with cache misses. Additionally, performance modeling of the hard disk allows testing a particular boot plan against other iterations of the boot plan to determine which data retrieval plan affords the lowest overall latency at the system level. The boot plan may include an ordered list of physical disk locations to read and place into a cache memory. The boot plan may incorporate measured disk latency and a margin for cache misses to help ensure that data from each physical location is placed in the cache before a deadline corresponding to the first time that data was accessed in one or more previous boots.

At block 202, a model of memory, i.e. disk, performance may be developed for use in determining data retrieval latency with respect to deadline times, as well as to allow comparison of one boot plan to another to allow selection of the more efficient. Because most mass storage used in computers are rotating media, is such as hard disk 141 or optical disk 155, the mechanics of disk head movement and the rotating media are a significant factor in the time associated with retrieving data. As other forms of mass storage become prevalent, other methods of modeling memory performance may be adapted to accommodate latency characteristics of such memory. For the remainder of this discussion, mass storage will be assumed to be a hard disk drive 141.

Figure 3:
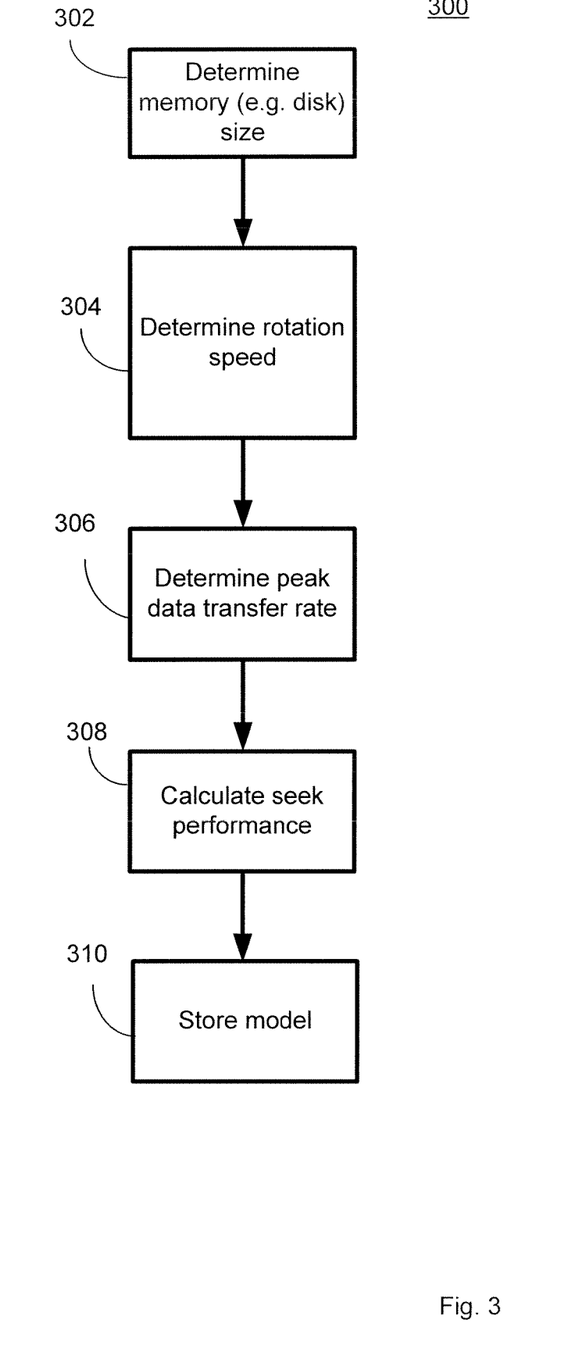
FIG. 3 is a method detailing a portion of the method of FIG. 1.

Referring briefly to FIG. 3, a method 300 of modeling memory performance is discussed and described. At blocks 302, 304, and 306, a determination may be made of memory size, disk rotation speed, and peak data transfer rate, respectively. This data may be determined through information supplied by the drive, such as drive 141, and known to the system, for example, through UPnP™ (Universal Plug-n-Play) information. At block 308, seek performance may be calculated as a function of distance and time for various seek ranges, for example, from an inner track to an outer track. When characterizing seek performance, different seek distances may be grouped together for both modeling and for comparing actual measured seek time with predicted seek time. In one embodiment, approximately 20 seek distance groupings may be created using an exponential formula, for example, adding one bit to each seek distance measurement. At block 310, the model may be stored for use in developing the boot plan. The model may be refined over time, or periodically re-performed, for example, to accommodate physical changes in the disk over time.

Returning to FIG. 2, at least one trace, or log, file may be read at block 204 and the physical addresses and access times for each memory access during the boot cycle may be extracted from the trace file. In one embodiment, the five most recent trace files may be read. The trace files may include data about the physical address of each disk access and an associated time for that access. In one embodiment, the files are creating using an event framework, such as Microsoft's ETW framework. As opposed to prior art logging, these trace files store physical disk addresses in addition to logical file names and offsets. When working at the physical disk address level, the defragmentation process may need to be accounted for. Defragmentation attempts to move data on a disk to group logical file segments into consecutive disk segments. To provide some defragementation resilience, a comparison of virtual address to physical address may be made to rediscover physical offsets of data on the disk.

Block 206 creates a correction factor may be generated for each seek distance grouping based on measured seek times. The combination of physical characteristics, seek times, and seek correction vectors may be stored for use in refining the memory (disk) model of block 202.

Figure 4:
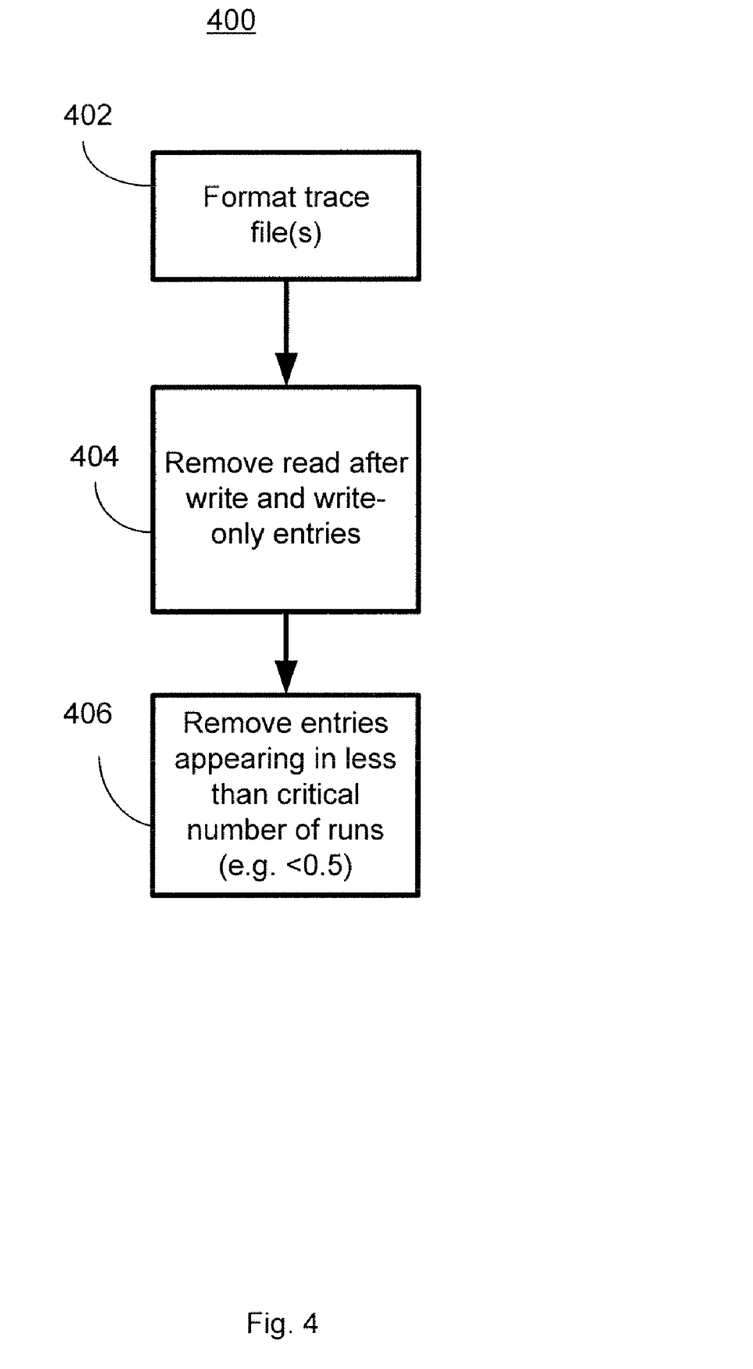
FIG. 4 is a method detailing another portion of the method of FIG. 1.

At block 208, when more than one trace file is available, they may be evaluated and compared to remove extraneous data representing disk accesses that are not likely to be repeated in a future boot. Turning briefly to FIG. 4, the filtering process is discussed in more detail. The filtering process may use one or more criteria to remove irrelevant or suspicious data, leaving second data that is passed to the next step in the process. A method 400 of filtering trace files begins at block 402 by formatting the trace files to allow easy comparison and to develop clusters, i.e. groupings of disk reads from nearby regions of the disk. At block 404, a read that follows a write to the same address may be removed. Such read-after-write data is likely to be temporary data generated during the boot process and is not likely to be significant in a future boot. Similarly, write only accesses may be discarded since there is no predictive way to know when that data may be used, if at all, during the next boot cycle.

At block 406, a comparison may be made between the log files to determine what addresses occur in more than one boot trace. In one embodiment, addresses that are accessed in fewer than half the trace files are removed, while addresses appearing in more than half the trace files are kept for further processing. The assumption being that address accesses that appear infrequently may not be critical and are therefore not included in the boot plan. If information has been added, as a result of a program installation, for example, it will appear consistently and eventually be included in the boot plan over a succession of boots. Figures of merit other than one half may be used based on observations of cache hits and misses and the overall time required by the boot cycle. That is, in a relatively sparse boot, i.e. a small amount of data is loaded, caching data that will not subsequently be accessed may be more efficient than caching similar unused data in a relatively dense boot. The result at the end of processing at block 406 is a single listing of boot data accesses having a physical address on the disk drive 141 and the time at which the access occurred.

Returning to FIG. 2, processing may resume at block 210, where the filtered, unified log produced at block 208 may be arranged according to second criteria to produce an initial boot plan. After an initial boot plan has been generated, at block 212 a second iteration may be performed to create a second boot plan that may be tested using the disk model to determine which of the two is likely to produce the faster boot. One exemplary method of performing the steps of blocks 210 and 212 is shown in FIG. 5.

Figure 5:
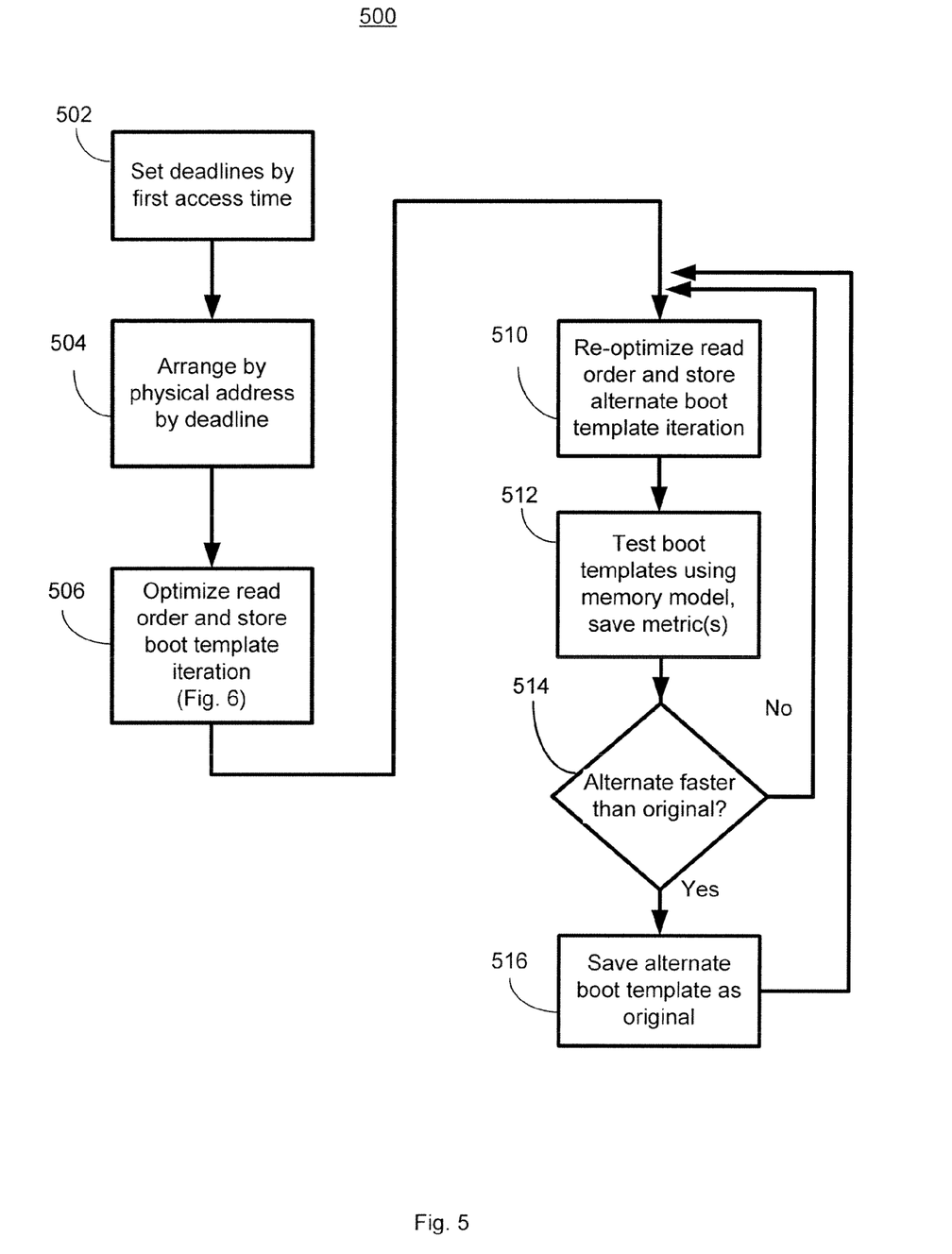
FIG. 5 is a method detailing another portion of the method of FIG. 1.

Turning briefly to FIG. 5, a method 500 for optimizing the boot plan is discussed and described. At block 502, each entry is given a deadline equal to its time of first access. In one embodiment, the deadline may be given the highest priority when arranging data reads to cache memory. At block 504, reads may be arranged by deadline and by physical address to create a boot plan. One goal of the method 200 is to attempt to always have data read from disk and available in the cache when requested by a foreground process. At block 506, organization of the data is begun to help achieve that goal. By starting with the earliest accessed data and determining for each successive read the expected latency based on disk seek time, using the memory model created above, it may be determined which disk reads will be late or early compared to its own deadline. When a read will be late, it may need to be moved earlier in the boot plan. When a read will be early, it may be moved later, creating a gap between reads. In one embodiment, this gap may be used to allow another read to be moved up, for example, a late read from farther down in the process.

When the reads have been ordered by deadline, a second pass may be made to further align reads by physical address to take advantage of the mechanics of the disk head movement and disk rotation to order memory reads in a sequence that uses one continuous sweep through the disk. For example, data may be read from outside tracks to inside tracks. Such organization may particularly attempt to avoid backtracking the head, as well as avoiding arriving at a track and having to wait a significant portion of a full rotation of the disk in order to read the segment desired. A final test of the boot plan using the memory model may be made to confirm that the various deadlines are met. Adjustments to read queue times with respect to deadlines may be made to account for calculated latency. When physical access has been accounted for, additional optimizations may be made by observing where nearby, or even consecutive, addresses exist. Because latency doesn't change when reading non-adjacent segments of a track vs. reading those non-adjacent segments and intervening segments, these so-called "free" reads may also be included in the boot plan.

Because many options may exist in the ordering of read requests in the boot plan, an alternative plan may be developed using different organization of sweeps through the disk. At block 510, an alternate boot plan may be developed using a different algorithm or weights, for example, a different move up order, a different safety factor for meeting deadlines, or the like. The alternate boot plan may then be tested at block 512 using the memory model and the original and alternate models compared at block 514. If the original boot plan is faster, it may be saved and the 'no' branch from block 514 followed to block 510 and the process repeated. If the alternate boot plan is faster, the 'yes' branch from block 514 may be followed and saved in place of the original boot plan at block 516 and processing continued at block 510.

The processing of boot plans according to the method of FIG. 5, or an equivalent set of steps, may be performed in the background during normal operation of the computer 110, especially during periods of low system activity, low user activity, or both. The process may be repeated at length until no further improvements are apparent, for example, when a succession of alternate boot plans do not result in an improved plan. It should be noted that the development and use of a boot plan is purely optional. Should two boots happen in succession before a boot plan can be developed, the computer will still boot normally, although more slowly.

Returning to FIG. 2, processing may continue at block 214, where the boot plan may be optionally compressed and stored. The boot plan may be stored on the mass storage device, for example, in the registry of a Windows™ machine, where it may be read early in a subsequent boot process. Because the boot plan itself must be read off the disk at boot time, it may be faster to read in the smaller, compressed, boot plan file and trade off processor time to decompress it than to burden the disk I/O with a larger, uncompressed, boot plan file. Because the processor is relatively lightly loaded during boot compared with disk I/O, it may often be the case that compression of the boot plan file is advantageous. Again, the memory model can help determine the efficacy of compression, or it may just be assumed.

At block 216, the boot plan may be loaded during a next boot of the computer 110. After loading, and optional decompression, the boot plan may be followed and, at block 218, disk reads queued to begin pulling data off the disk and placing the data in a cache allocated from normal system memory 130. Data reads from system memory may be many orders of magnitude faster than reads from mass storage, such as disk drive 141.

At block 220, requests for data from foreground processes may be processed normally and intercepted after resolution of the request to a physical disk location. A process running the boot plan may determine if the requested data has already been read from disk and is available in the cache. If the data is available, it may be supplied from cache, eliminating the need to wait for queuing to the disk and the subsequent latency associated with reading the data from disk after reaching the top of the queue.

Figure 6:
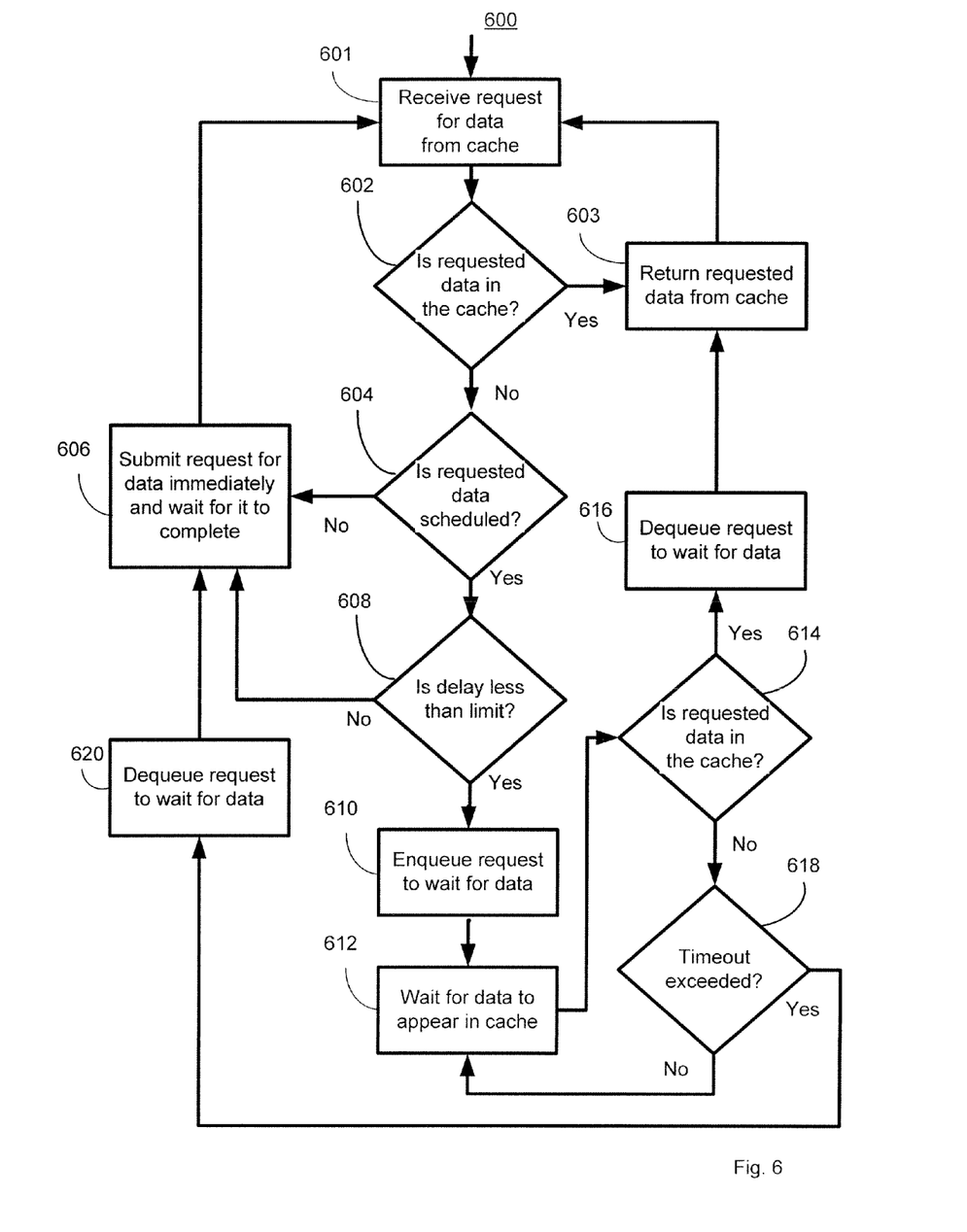
FIG. 6 is a method detailing yet another portion of the method of FIG. 1.

Turning to FIG. 6, a discussion of queue and cache management associated with block 220 is discussed. FIG. 6, a method 600 of managing caching and queuing, begins at block 601 when receiving a request for data. The request may be evaluated at block 602 to determine if the requested data is already in the cache. If the data is available, the yes branch may be followed to block 603 and the data supplied. If not, the no branch from block 602 may be taken to block 604 where it may be determined if the requested data is scheduled for retrieval, that is, is in the boot plan but has not yet been retrieved. If the requested data has not been scheduled, the no branch from block 604 may be followed to block 606. At block 606, a request for the data may be placed in an immediate queue and retrieved. If the requested data has been scheduled the 'yes' branch from block 604 may be followed to block 608. A cache miss at block 604, that is, when the requested data is not in the boot plan, may often predict a number of cache misses to follow, for example, when an unscheduled file stored on several disk segments is being read. To accommodate related cache misses, a failure at block 604 may cause processing of the boot plan to pause for a predetermined period, for example, 5 milliseconds.

At block 608, the schedule time for the retrieval of the requested data may be evaluated to determine if waiting for the regularly scheduled time would cause a delay that exceeds a given figure of merit. If the delay is more than the figure of merit, for example, 20 milliseconds, the no branch may be followed to block 606 for immediate retrieval of the data. If the delay is less than the figure of merit the 'yes' branch from block 608 may be followed to block 610. At block 610, a request for the data is queued and a wait state at block 612 is entered. After the wait period, execution continues at block 614 where the cache is checked to determine if the data is now available. If yes, the request is removed from the queue at block 616 and the data returned to the requesting process at block 603. If the data is not available at block 614, the no branch may be followed to block 618 where a timeout is checked to determine that the request has not exceeded a certain allowable age. If the timeout period has been exceeded, that is, the age of the cache request has exceeded a limit, the yes branch from block 618 may be followed to block 620. There, the request is removed from the queue and a request for immediate service may be submitted at block 606. If the timeout period has not been exceeded, processing continues at block 612 by entering the wait period again.

Prior art boot plans, for example, those using logical file retrieval, often used a fixed pattern for retrieving data. In one prior art embodiment, boot plan data was retrieved in large units, for example, one third at a time, and placed in cache to the exclusion of OS requests, such as cache misses. Execution of a boot plan in accordance with the current disclosure may limit the number of boot plan to requests in the queue so that foreground requests that are not retrievable from the cache (a cache miss) may be queued to the disk and not have to wait through a lengthy queue. For example, in one embodiment, no more than two disk data reads are queued from the boot plan at a time.

Execution of the methods and techniques described in FIG. 2 and its related figures may be carried out by number of mechanisms including, but not limited to, both firmware and software embodiments. Computer executable instructions stored on computer readable media may be used to effect the advantageous methods described above. Use of the above described techniques can create a noticeable improvement in computer boot time, in some cases, 3-5 times faster boot times compared with no pre-fetching of boot data. This time savings may result in both increased user satisfaction and increased productivity to the benefit of not only users, but also, in a business environment, to their employers as well.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

We claim:

1. A method of loading data used to boot a computer comprising:
reading a trace for each of at least one previous boot;
extracting a physical address and an access time for memory accesses during the at least one previous boot to create a boot list;
filtering the boot list to remove first data meeting a first criteria, leaving second data; arranging the second data according to a second criteria to create a boot plan;
storing the boot plan;
when booting the computer, retrieving boot data from the corresponding physical addresses according to the boot plan;
analyzing requests for boot data;
determining when requested boot data not in the cache is scheduled for retrieval;
holding the request for servicing after the retrieval as scheduled; and
caching the boot data for use when requested by a foreground process.

2. The method of claim 1, wherein the second criteria corresponds to the physical address and an earliest access time corresponding to the memory access.

3. The method of claim 1, further comprising comparing the physical address and a corresponding logical addresses to determine when data has moved due to a defragmentation process.

4. The method of claim 1, further comprising processing the request immediately when a delay caused by holding the request for servicing will exceed a limit.

5. The method of claim 1, further comprising adding a physical address to the boot plan that is surrounded by physical addresses existing in the boot plan.

6. The method of claim 1, wherein the second criteria comprises modeling disk performance for evaluating total boot data retrieval time.

7. The method of claim 1, further comprising limiting a read queue to allow cache misses to retrieve boot data.

8. The method of claim 1, wherein reading the trace for each of at least one previous boot comprises reading a plurality of boot traces and wherein filtering the data comprises removing first data not meeting a criteria corresponding to one or more of which trace the first data appears in, how many traces the first data appears in, or physical location of the first data.

9. The method of claim 1, further comprising suspending, for a period, retrieving boot data according to the boot plan responsive to foreground data retrieval activity comprising at least one of a cache read miss, a cache read timeout, and a disk write.

10. The method of claim 1, further comprising aging cache requests and failing the cache request when the cache request age exceeds a limit.

11. A method of preparing an optimized data access plan for retrieving data from a memory for use in a boot operation comprising:
modeling memory performance in terms of data retrieval latency with respect to a requested time of data delivery;
getting a trace of physical address access from a previous boot, the trace including a physical address location and a time of first access for each requested data entry;
assigning the time of first access to be a deadline for retrieving a particular data entry;
analyzing the trace to develop the data access plan by first ordering each requested data entry by its respective deadline;
testing the data access plan using the model of memory performance to determine which data entry accesses will be early or late compared to its respective deadline;
iterating modified data access plans and testing to arrive at the optimized data access plan wherein data entry accesses are optimized to at least minimize late deadline performance;
storing the optimized data access plan; and accessing boot data during a subsequent boot using the optimized data access plan.

12. The method of claim 11, wherein iterating modified data access plans comprises first optimizing the data access plan for minimizing late deadline performance and then optimizing physical memory access patterns for reductions in disk head movement.

13. The method of claim 11, wherein analyzing the trace comprises removing physical memory accesses associated with temporary data and write operations.

14. The method of claim 11, wherein analyzing the trace comprises determining a fetch time deadline for specific data retrieval, wherein the fetch time deadline is based at least in part on a time of first access from the trace.

15. A computer-readable storage medium having computer-executable instructions for implementing a method of accessing boot data stored on a disk drive comprising:
retrieving a log of physical memory access during at least one previous boot, the log comprising a physical memory location and a time of first access for each of a plurality of boot data entries;
assigning the time of first access to be a deadline for accessing each respective boot data entry of the plurality of boot data entries;
generating a plan for accessing the boot data entries by organizing the log of physical memory access during the at least one previous boot according to a schedule time based on the time of first access of each physical memory access during the at least one previous boot;
modeling the performance of the plan for accessing boot data;
adjusting the plan to optimize the access to each respective boot data entry by its respective deadline based on a result of the modeling;
re-adjusting the plan to minimize disk head movement;
iterating the modeling, adjusting, and re-adjusting steps to develop a final plan that optimizes a combination of performance to deadline and disk head movement; and
storing the final plan for accessing boot data for use in a subsequent boot operation.

16. The computer-readable storage medium of claim 15, wherein generating the plan for accessing boot data comprises creating a model of disk drive performance relative to data retrieval and generating the plan for accessing boot data comprises further organizing the log of physical memory access according to the model to minimize disk access time.

17. The computer-readable storage medium of claim 16, further comprising computer-executable instructions for testing each of a plurality of plans using the model of disk drive performance to determine a best performing plan for storing as the final plan.

18. The computer-readable storage medium of claim 15, further comprising computer-executable instructions removing from the log of physical memory access those physical memory accesses associated with one of temporary data and write data.

* * * * *